United States Patent
Miyamura et al.

(10) Patent No.: US 11,762,603 B2
(45) Date of Patent: Sep. 19, 2023

(54) STORING MODIFIED OR UNMODIFIED PORTIONS OF A FILE BASED ON TAPE LOADING

(71) Applicant: International Business Machines Corporation, Armonk, NY (US)

(72) Inventors: Tsuyoshi Miyamura, Yokohama (JP); Tohru Hasegawa, Tokyo (JP); Hiroshi Itagaki, Yokohama (JP); Atsushi Abe, Ebina (JP); Shinsuke Mitsuma, Machida (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 17/668,467

(22) Filed: Feb. 10, 2022

(65) Prior Publication Data
US 2023/0251800 A1    Aug. 10, 2023

(51) Int. Cl.
*G06F 3/06* (2006.01)

(52) U.S. Cl.
CPC .......... *G06F 3/0686* (2013.01); *G06F 3/0608* (2013.01); *G06F 3/0611* (2013.01); *G06F 3/0643* (2013.01)

(58) Field of Classification Search
CPC .... G06F 3/0608; G06F 3/0611; G06F 3/0643; G06F 3/0686; G06F 3/0647–0649
See application file for complete search history.

(56) References Cited

U.S. PATENT DOCUMENTS

| | | | |
|---|---|---|---|
| 8,055,864 B2 | 11/2011 | Sawdon et al. | |
| 9,372,868 B2 | 6/2016 | Ashida | |
| 10,997,127 B2 | 5/2021 | Miyoshi | |
| 2016/0042090 A1 | 2/2016 | Mitkar | |
| 2016/0299723 A1* | 10/2016 | Hasegawa | G11B 27/002 |
| 2017/0153840 A1* | 6/2017 | Hasegawa | G06F 3/0604 |

OTHER PUBLICATIONS

"Linear Tape File System (LTFS) Format Specification", Version 2.5.1, SNIA Standard, Aug. 18, 2020, 104 pages.

(Continued)

*Primary Examiner* — Chie Yew
(74) *Attorney, Agent, or Firm* — Aaron N. Pontikos (57) ABSTRACT

A computer-implemented method for migrating file data in a hierarchical storage environment includes: detecting that a file recalled from a magnetic tape to a primary storage device was modified; determining whether the magnetic tape from which the file was recalled is loaded in a tape drive upon detecting that the file was modified; responsive to determining that the magnetic tape from which the file was recalled is loaded in the tape drive upon detecting that the file was modified, appending only a modified portion of the file to the magnetic tape; and responsive to determining that the magnetic tape from which the file was recalled is not loaded in the tape drive upon detecting that the file was modified, appending the file in its entirety, including the modified portion of the file and any unmodified portions of the file, to a different magnetic tape.

20 Claims, 7 Drawing Sheets

(56) References Cited

OTHER PUBLICATIONS

"Snapshots of GPFS file systems or filesets", IBM Storage Insights, downloaded from the Internet on Nov. 10, 2021, 1 page, <https://www.ibm.com/docs/en/storage-insights?topic=resources-snapshots-gpfs-file-systems-filesets>.

"Transparent recall processing", IBM Tivoli Storage Manager for Space Management, Version 7.1, downloaded from the Internet on Oct. 26, 2021, 1 page, <https://www.ibm.com/docs/en/tsm/7.1.0?topic=files-transparent-recall-processing>.

Mell et al., "The NIST Definition of Cloud Computing", Recommendations of the National Institute of Standards and Technology, Special Publication 800-145, Sep. 2011, 7 pages.

* cited by examiner

STORING MODIFIED OR UNMODIFIED PORTIONS OF A FILE BASED ON TAPE LOADING

BACKGROUND

The present invention relates generally to the field of hierarchical storage management, and more particularly to migrating data within a hierarchical storage environment.

Hierarchical storage management is a data storage process that migrates data within a tiered storage environment. In a tiered storage environment, at least two types of data storage media are delineated by differences in attributes, such as price, performance, capacity, and function. Accordingly, whether data is stored in one tier or another is defined by the requirements of the data to be stored. Typically, data files are migrated back and forth between a primary, high-speed storage media, such as a hard disk, and a secondary, slower speed storage media, such as magnetic tape, based on utilization needs of particular data files.

SUMMARY

According to one embodiment of the present invention, a computer-implemented method for migrating file data in a hierarchical storage environment is disclosed. The computer-implemented method includes detecting that a file recalled from a secondary storage device to a primary storage device was modified. The computer-implemented method further includes determining whether a magnetic tape from which the file was recalled is loaded in a tape drive upon detecting that the file was modified. The computer-implemented method further includes, responsive to determining that the magnetic tape from which the file was recalled is loaded in the tape drive upon detecting that the file was modified, appending only a modified portion of the file to the magnetic tape. The computer-implemented method further includes, responsive to determining that the magnetic tape from which the file was recalled is not loaded in the tape drive upon detecting that the file was modified, appending the file in its entirety, including the modified portion of the file and any unmodified portions of the file, to a different magnetic tape.

According to another embodiment of the present invention, a computer program product for migrating file data in a hierarchical storage environment is disclosed. The computer program product includes one or more computer readable storage media and program instructions stored on the one or more computer readable storage media. The program instructions include instructions to detect that a file recalled from a secondary storage device to a primary storage device was modified. The program instructions further include instructions to determine whether a magnetic tape from which the file was recalled is loaded in a tape drive upon detecting that the file was modified. The program instructions further include, responsive to determining that the magnetic tape from which the file was recalled is loaded in the tape drive upon detecting that the file was modified, instructions to append only a modified portion of the file to the magnetic tape. The computer program instructions further include, responsive to determining that the magnetic tape from which the file was recalled is not loaded in the tape drive upon detecting that the file was modified, instructions to append the file in its entirety, including the modified portion of the file and any unmodified portions of the file, to a different magnetic tape.

According to another embodiment of the present invention, a computer system for migrating file data in a hierarchical storage environment is disclosed. The computer system includes one or more computer system includes one or more computer processors, one or more computer readable storage media, and program instructions stored on the computer readable storage media for execution by at least one of the one or more processors. The program instructions include instructions to detect that a file recalled from a secondary storage device to a primary storage device was modified. The program instructions further include instructions to determine whether a magnetic tape from which the file was recalled is loaded in a tape drive upon detecting that the file was modified. The program instructions further include, responsive to determining that the magnetic tape from which the file was recalled is loaded in the tape drive upon detecting that the file was modified, instructions to append only a modified portion of the file to the magnetic tape. The computer program instructions further include, responsive to determining that the magnetic tape from which the file was recalled is not loaded in the tape drive upon detecting that the file was modified, instructions to append the file in its entirety, including the modified portion of the file and any unmodified portions of the file, to a different magnetic tape.

DETAILED DESCRIPTION

The present invention relates generally to the field of hierarchical storage management, and more particularly to migrating data within a hierarchical storage environment.

The use of hierarchical storage management allows an enterprise to reduce the cost of data storage, as well as simplify the retrieval of data from slower storage media. Typically, hierarchical storage management is used for deep archival storage of data that is required to be maintained for a prolonged period at low cost. The need for hierarchical storage management stems from the fact that high-speed storage devices (e.g., solid state drive arrays) are more expensive (per byte stored) than slower speed storage devices (e.g., hard disk drives, optical discs, and magnetic tape drives). With hierarchical storage management, infrequently used data files stored on high-speed storage media are migrated to slower speed storage media if the data files are not used (i.e., accessed) for a certain period of time. When access to the data files are required, data is copied or recalled from the secondary storage to the primary storage. In effect, hierarchical storage management turns a fast disk drive into a cache for the slower mass storage devices.

Generally, within a hierarchical storage environment, files are not migrated from a primary storage to a secondary storage with the same sense of urgency as files recalled to primary storage from secondary storage. Oftentimes, data is migrated from a primary, high-speed storage media to a secondary, slower speed storage media during off-peak hours or when workload requirements (e.g., read/write operations) of a storage system(s) is low. For example, batch jobs are collected when system workload requirements are high and later executed when system workload requirements are low. In another example, files designated for migration are first added to a migration queue and subsequently migrated to secondary storage on a first in first out (FIFO) basis if system workload requirements permit migration.

Whereas data migration from primary storage to secondary storage is often a low priority, accessing data from a secondary storage (i.e., recalling data) is typically a high priority. This stems from the fact that data is oftentimes recalled from a secondary storage to a primary storage based on a relative immediate need for access to the data. However, embodiments of the present invention recognize that read access times to file data stored on tape increase as the distance between data extents recorded on a tape increase. This stems from the fact that a tape drive is a sequential access device, in which any changes made to file data are appended to the end of the last written file data as a separate data extent. Accordingly, when a file is recalled, the more data extents associated with a file, and the further apart the data extents are from each other, the longer it takes read, and thereby recall the file.

One possible solution to decreasing the read access times to file data stored on tape is to append the entire file to the tape media as a single extent each time the file is modified, even if the modification is relatively minor. In this way, when the file is subsequently recalled, the read access time to the file is greatly improved since the entire file is recorded as a single extent. However, embodiments of the present invention recognize that appending an entire file each time the file is modified will consume significantly more storage space on the tape media, resulting in increased storage costs.

Embodiments of the present invention provide for improvements to one or more of the above mentioned challenges in the field of LTFSs by keeping multiple backups of file data on multiple tapes. According to an embodiment of the present invention, when a file is recalled from a secondary storage device, such as a tape drive, to a primary storage device, such as a HDD, and the tape media from which the file is recalled is still loaded in a tape drive after modifications to the file are detected, only the modified portions of the file are written to or otherwise appended to the tape. However, if the tape media from which the file is recalled from is no longer loaded in a tape drive after modifications to the file are detected, the entire file, including any modifications thereto, are written to or otherwise appended to a different tape from which the file was recalled from.

In this way, when a file is recalled at a later point in time, the tape having a version of the file stored as a single extent is selected, since the access time to the file stored as a single extent will be faster than the access time to the filed stored on another tape as multiple, non-contiguous extents. On the other hand, if the same tape from which the file was recalled is still loaded after the file has been modified, only the modified portion of the file is written to or otherwise appended to the tape. In this way, the amount of storage space consumed by file data is still reduced since the entire modified file is not appended to the tape after each instance in which the file is modified.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
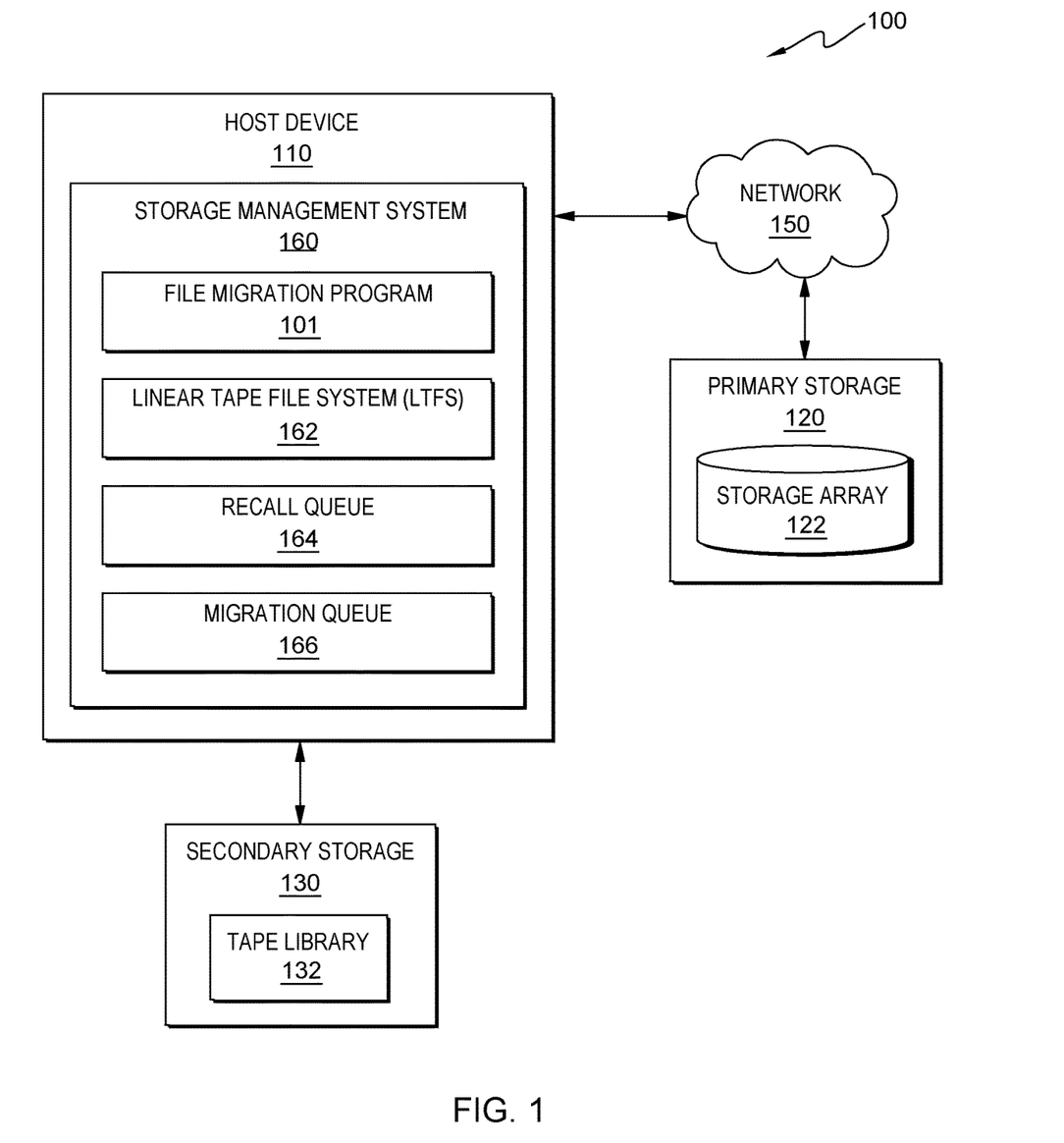
FIG. 1 is a functional block diagram of a network computing environment, generally designated 100, suitable for operation of a file migration program 101 in accordance with at least one embodiment of the present invention.

Referring now to various embodiments of the invention in more detail, FIG. 1 is a functional block diagram of a network computing environment, generally designated 100, suitable for operation of a file migration program 101 in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

Network computing environment 100 includes host device 110, primary storage 120, and secondary storage 130 interconnected over network 150. In embodiments of the present invention, network 150 can be a telecommunications network, a local area network (LAN), a wide area network (WAN), such as the Internet, or a combination of the three, and can include wired, wireless, or fiber optic connections. Network 150 may include one or more wired and/or wireless networks that are capable of receiving and transmitting data, voice, and/or video signals, including multimedia signals that include voice, data, and video information. In general, network 150 may be any combination of connections and protocols that will support communications between host device 110, primary storage 120, secondary storage 130, and other computing devices (not shown) within network computing environment 100.

In various embodiments of the present invention, host device 110 is a computing device that can be a standalone device, a management server, a web server, a mobile device, or any other electronic device or computing system capable of receiving, sending, and processing data. In other embodiments, host device 110 represents a server computing system utilizing multiple computers as a server system, such as in a cloud computing environment. In an embodiment, host device 110 represents a computing system utilizing clustered computers and components (e.g., database server computers, application server computers, web server computers, etc.) that act as a single pool of seamless resources when accessed within network computing environment 100. In general, host device 110 represents any programmable electronic device or combination of programmable electronic devices capable of executing machine readable program instructions and communicating with primary storage 120, secondary storage 130, and other computing devices (not shown) within network computing environment 100 via a network, such as network 150.

Host device 110 includes storage management system 160. In various embodiments, storage management system 160 can migrate and recall data between primary storage 120 and secondary storage 130. Storage management system 160 can be a local or cloud storage and backup system (e.g., a special storage device, group of devices, etc.), that includes software, firmware, etc., that can have hierarchical storage management functionality, whereby data can be migrated and recalled between tiered storage. Although various components of storage management system 160 are depicted in FIG. 1 as being integrated with host device 110, in alternative embodiments, various components of storage management system 160 can be remotely located from host device 110.

Storage management system 160 includes linear tape file system (LTFS) 162. A LTFS is a file system that allows files stored on tape media (e.g., tape cartridges) in a tape library to be accessed in a similar fashion as files stored on a hard disk or flash drive. It requires both a specific format of data on the tape media and software to provide a file system interface to the data. Each LTFS formatted tape media in a tape library appears as a separate folder under the filesystem mount point. One of ordinary skill in the art will appreciate that applying a file system to a tape drive allows users to organize and search the contents of tape media as they would on hard disk, improving access time for data stored on tape media. For example, LTFS 162 can be an IBM Linear Tape File System—Library Edition (LTFS—LE) that allows LTFS volumes (i.e., tape media) to be used with a tape library, such as tape library 132. While reference is made to IBM-specific hardware and/or software components, it should be understood that aspects of the present invention may be applied equally to other file system and storage management technologies.

One of ordinary skill in the art will further appreciate that although data stored in a LTFS appears to behave like data stored on a hard disk, the fundamental sequential nature of writing data to tape media remains. File data is sequentially written to zones (i.e., logical blocks) of a predetermined, fixed size and files are always appended to the end of the tape media. Furthermore, a LTFS is a write-once file system. In other words, if a file stored on one or more data blocks is modified, overwritten or removed, the associated data blocks are not freed up. Rather, the memory allocated to the associated data blocks becomes invalid (i.e., the associated data blocks are no longer referenced in an index) and newly added file data is written as separate, non-contiguous blocks at the end of the tape media.

The term "file" as used herein shall refer to a group of logically related data extents together with associated file meta-data. The term "data extent" as used herein shall refer to a contiguous sequence of recorded blocks (i.e., a set of one or more sequential logical blocks used to store file data). In an embodiment, a file is recorded as one or more extents and each extent corresponds to one or more records. In an embodiment, all records within a data extent have a predetermined storage length (also known as the "block size"). In an embodiment, the default block size is 512 KB or 0.5 MB. In an embodiment, the default block size is 1,024 KB or 1 MB. However, it should be appreciated that the default block size may be any predetermined size.

In an embodiment, the mapping from file byte offsets to block positions is maintained in an index partition and is generally referred to as an extent list. Each entry in an extent list for a file encodes a range of bytes in the file as a range of contiguous bytes in a data extent. Each data extent included in the extent list includes the following information:
  (i) Start Block—the block number within the data extent where the content for the extent begins;
  (ii) Byte Offset—the number of bytes from the beginning of the start block to the beginning of the file data for the extent.
  (iii) Byte Count—the number of bytes of file content in the data extent; and
  (iv) File Offset—the number of bytes from the beginning of the file to the beginning of the file data recorded for the extent.

In various embodiments, storage management system 160 can convert input/output requests directed to tape library 132 to storage array 122. For example, storage management system 160 receives a write request from a client device for a record initially directed to be stored on a tape media in tape library 132. However, rather than directly writing the data to the tape media, storage management system 160 writes (i.e., "saves" or "stores") the data as a logical volume (i.e., virtual volume) on a disk cache of storage array 122.

In various embodiments, storage management system 160 can recall data from secondary storage 130 to primary storage 120. For example, in response to receiving a read request, storage management system 160 determines whether the data associated with the read request is stored in primary storage 120 or secondary storage 130. If the requested data is stored in primary storage 120, the data is simply read from storage array 122. However, if the requested data is stored in secondary storage 130, storage management system 160 can recall (i.e., load) the data from a magnetic tape media of tape library 132 to storage array 122.

In some embodiments, storage management system 160 recalls data from secondary storage 130 to primary storage 120 in accordance with recall queue 164. In an embodiment, recall queue 164 is a circular queue, in which file data is recalled from secondary storage 130 to primary storage 120 on a FIFO basis. In another embodiment, recall queue 164 is a batch queue, in which file data is recalled from secondary storage 130 to primary storage 120 in batches. In another embodiment, recall queue 164 is a priority queue, in which file data is recalled from secondary storage 130 to primary storage 120 based on a priority level associated with a data file. For example, a data file having a high priority is recalled before a data file with a low priority.

In various embodiments, storage management system 160 can migrate data from primary storage 120 to secondary storage 130. In some embodiments, storage management system 160 migrates data from primary storage 120 to secondary storage 130 in accordance with migration queue 166. In an embodiment, migration queue 166 is a circular queue, in which file data is migrated from primary storage 120 to secondary storage 130 on a first in first out (FIFO) basis. In another embodiment, migration queue 166 is a batch queue, in which file data is migrated from primary storage 120 to secondary storage 130 in batches. In another embodiment, migration queue 166 is a priority queue, in which file data is migrated from primary storage 120 to secondary storage 130 based on a priority level associated with a data file. For example, a data file having a low priority is migrated before a data file with a high priority.

In other embodiments, storage management system 160 migrates data from primary storage 120 to secondary storage 130 based on one or more data migration policies. In an embodiment, a data migration policy may include a rule to migrate data from primary storage 120 to secondary storage 130 based on an amount of free storage space of primary storage falling below a predetermined threshold value. In embodiment, a data migration policy may include a rule to migrate data from primary storage 120 to secondary storage 130 based on a last access time of a data file from primary storage 120. For example, a data file is automatically migrated if a length of time in which the file was last accessed exceeds a predetermined threshold value. In an embodiment, a storage policy may include a rule to migrate data from primary storage 120 to secondary storage 130 in response to a user or system administrator selecting files for migration.

In some embodiments, secondary storage 130 is a tape storage pool, in which multiple file backups are stored on multiple, different tape media. In an embodiment, storage management system 160 selects a particular tape media to recall a file based on a shortest read access time to the file. For example, assume that a backup of File A is stored on both Tape 1 and Tape 2. The most recent version of File A is written to Tape 1 as four non-contiguous data extents and File A is also written to Tape 2, but as a single data extent, then storage management system 160 will recall File A from Tape 2 since the read access time to a file written as a single data extent is faster than the read access time to a file written as four non-contiguous data extents.

In accordance with embodiments of the present invention, the following states of data or files shall apply. File data that is only written to primary storage 120 may be referred to as being in a Resident State. File data that is written to both primary storage 120 and secondary storage 130 may be referred to as being in a Pre-Migration State or Dual Resident State. File data that is only written to secondary storage 130 may be referred to as being in a Migrated State. For example, when a file is in a migrated state, the file can be recalled using a recall command, in which the file is moved to being in the Pre-migrated State (i.e., both on disk and tape). If the migrated file on disk is modified, the modified file is moved to being in the Resident State. After the modified file is migrated to tape, and the modified file is deleted from the disk, the modified file is moved to being in the Migrated State.

In an embodiment, storage management system 160 performs the following actions in response to receiving a request to update a file stored in secondary storage. The file is recalled from secondary storage, which involves retrieving the file from secondary storage and writing the file to primary storage. After writing the file to primary storage, the file remains in a pre-migrated state, in which an active or valid copy of the file remains in both secondary storage and primary storage. After updating the file written to primary storage, the file transitions to a resident state, in which only the update file stored in primary storage remains active or valid and the file written to secondary storage becomes inactive or invalidated. After migrating the updated file from primary storage to secondary storage, and deleting the updated file from primary storage, the file transitions to a migrated state, in which the file stored in secondary storage becomes active or valid.

In some embodiments, storage management system 160 takes and records point-in-time copies, such as snapshots or backups of file system data in a point-in-time copy directory. For example, a snapshot may be a point-in-time copy of the changed data in a file system or file since the last time a snapshot was taken. In other embodiments, file migration program 101 does not take snapshots or system backups of file system data. Rather, storage management system 160 merely accesses point-in-time copies of file system data taken by other programs or systems, such as host device 110.

Storage management system 160 further includes file migration program 101. Although file migration program 101 is depicted in FIG. 1 as being integrated with file migration program 101, in alternative embodiments, file migration program 101 can be remotely located from storage management system 160. In some embodiments, file migration program 101 can be a component of storage management system 160. For example, file migration program 101 can be a software component or sub-system of storage management system 160. In other embodiments, file migration program 101 can be logically distinct from storage management system 160. For example, file migration program 101 can be an application running outside of storage management system 160.

In an embodiment, as depicted in FIG. 1, file migration program 101 operates on a central server, such as host device 110, and can be utilized by a client device via an application download from the central server or a third-party application store, and executed on the client device. In another embodiment, file migration program 101 may be software, downloaded from a central server, such as host device 110, and installed on a client device. In another embodiment, file migration program 101 may be utilized as a software service provided by a third-party cloud service provider (not shown). In another embodiment, file migration program 101 may include one or more components, such as add-ons, plug-ins, and agent programs, etc. (not shown), installed on a client device.

Tape library 132 can be an automated tape storage device that includes a plurality of tape drives for writing to and reading from tape media, such as, but not limited to, single-reel or two-reel magnetic tape cartridges. In an embodiment, tape library 132 can be an IBM TS3400™ Tape Library or an IBM TS3500™ Tape Library. While reference is made to IBM-specific hardware and/or software components, it should be understood that aspects of the present invention may be applied equally to other tape library technologies. In embodiments of the invention, tape library 132 can include a plurality of tape media stored in banks or groups of storage slots. For example, tape media may include, but is not limited to magnetic tape cartridges, magnetic tape cassettes, and optical tape cartridges. Tape library 132 can further include a plurality of slots to hold tape media (e.g., tape cartridges), a barcode reader to identify tape media and an automated method (e.g., a robot) for loading tape media.

Figure 2:
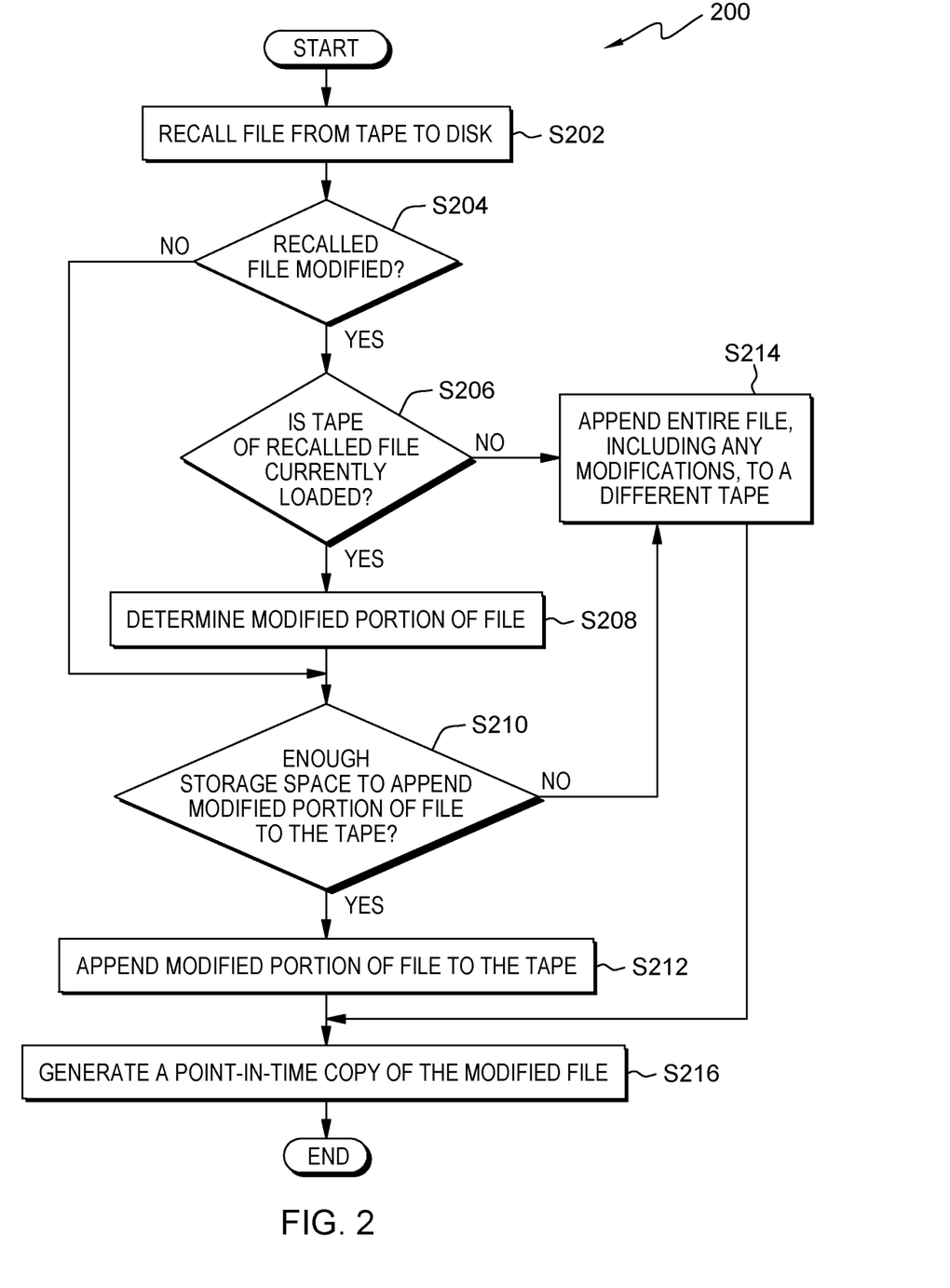
FIG. 2 is a flowchart diagram depicting operational steps by file migration program 101 for storing file data within a tiered storage environment in accordance with at least one embodiment of the present invention.

FIG. 2 is a flowchart diagram depicting operational steps by file migration program 101 for storing file data within a tiered storage environment in accordance with at least one embodiment of the present invention. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

At step S202, file migration program 101 recalls a file from a secondary storage device to a primary storage device. In an alternative embodiment, at step S202, file migration program 101 does not recall a file from a secondary storage device to a primary storage device. Rather, file migration program 101 simply determines or identifies that a file has been recalled from a secondary storage device to a primary storage device. In an embodiment, the secondary storage device is a magnetic tape, and the primary storage device is at least one of a hard disk drive (HDD) and a solid state drive (SSD). In an embodiment, the recalled file remains in a pre-migration state or dual resident state until the recalled file is modified. Upon modifying the recalled file, the file transitions to a resident state.

At decision step S204, file migration program 101 determines whether the recalled file has been modified. For example, a modification to the file may include, but is not limited to, updating the file data, modifying the file data, changing the file data, adding new file data to the file, and deleting a portion of the file data. In an embodiment, file migration program 101 determines that the recalled file has been modified based on automatically receiving a file modification message or alert. However, embodiments of the present invention may employ any generally known practices for detecting that a file has been modified.

At decision step S206, file migration program 101 determines whether the magnetic tape from which the file was recalled is loaded in a tape drive at a point in time at which the modification to the file is detected. Responsive to determining that the magnetic tape is not loaded in a tape drive at the point in time at which the modification to the file is detected (decision step "NO" branch), storage management proceeds to step S214. Responsive to determining that the magnetic is loaded in a tape drive at the point in time at which the modification to the file is detected (decision step "YES" branch), file migration program 101 proceeds to decision step S208.

At step S208, file migration program 101 compares the modified file to a previous version of the file to determine the portion of the file that was modified or otherwise changed. For example, file migration program 101 compares the modified file to a previous version of the file included in the most recent incremental snapshot. In another example, file migration program 101 compares the modified file to a previous version of the file included in a copy-on-write or redirect-on-write snapshot. However, embodiments of the present invention may employ any generally known practices for determining the modified portion(s) of a file. In an embodiment, determining the portion of the file that was modified further includes determining a data size of the modified portion of the file.

At decision step S210, file migration program 101 determines whether an amount of free storage space on the magnetic tape is sufficient to write the modification to the file. In other words, file migration program 101 determines whether the data size of the modified portion of the file is less than the amount of free storage space on the magnetic tape. It should be noted that since a tape drive is a sequential access device, data cannot be overwritten, but is always appended to the end of the last data record stored in the data partition of the magnetic tape. Accordingly, the amount of free storage space is calculated from the end of the last data record stored in the data partition of the magnetic tape. For example, the data size of the modified portion of the file is compared to the amount of free storage space subsequent to the end of the last data record written to the magnetic tape.

Responsive to determining that the amount of free storage space on the magnetic tape is not sufficient to write the modified portion of the file, file migration program 101 proceeds to step S214. Responsive to determining that the amount of free storage space on the magnetic tape is sufficient to write the modified portion of the file, file migration program 101 proceeds to step S212.

At step S212, file migration program 101 appends the modified portion of the file to the magnetic tape. In other words, only the modification made to the file, and not the entire file including the modification, is written to the magnetic tape. For example, assume that File A includes ten data records (Rec #1-Rec #10). If Rec #5 of File A is modified, then only Rec #5, and the modifications thereto, are appended to the end of the last data record stored in the data partition of the magnetic tape. As another example, assume that File B includes five data records (Rec #1-Rec #5). If the modification to File B is adding a new data record (Rec #6) to File B, then only newly added Rec #6 is appended to the end of the last data record stored in the data partition of the magnetic tape.

At step S214, file migration program 101 appends the entire file, including the modified portion and any unmodified portions, to another, distinct magnetic tape. In other words, the entire file is appended to a different tape other than the magnetic tape from which the file was originally recalled from. In an embodiment, the particular magnetic tape to which the entire file is appended to is selected based, at least in part, on the magnetic tape being currently loaded in a tape drive, and the magnetic tape having an amount of free storage space required to append the entire file as a single extent. In an embodiment, if no magnetic tape currently loaded in a tape drive has enough available storage space required to append the entire file as a single extent, the modified file is placed in migration queue 166, and appended to a different magnetic tape at a later point in time in accordance with migration queue 166. In another embodiment, if no magnetic tape currently loaded in a tape drive has enough available storage space required to append the entire file as a single extent, the modified file is appended to a different magnetic tape in accordance with one or more data migration policies as discussed herein.

At step S216, responsive to performing either step S212 or S214, file migration program 101 generates a point-in-time copy of the modified file. In an embodiment, generating a point-in-time copy of the modified file includes deleting a previous version of a point-in-time copy of the file. In an embodiment, the point-in-time copy of the modified file is an incremental snapshot or incremental backup, in which only the changes made to the file since the last snapshot or backup are stored. In an embodiment, the point-in-time copy of the modified file is a differential snapshot or differential backup, in which all changes made to the file since the last full backup are stored.

The point at which the point-in-time copy of the modified file is generated may vary depending on a point-in-time capture policy. For example, a point-in-time copy may be generated after each modified portion of a file is appended to secondary storage, after all modifications to a file are appended to secondary storage, at predetermined time intervals, after a modified file has changed from being in a Resident State to a Pre-Migrated State, or after a modified file has changed from being in a Pre-Migrated State to a Migrated State.

Figure 3:
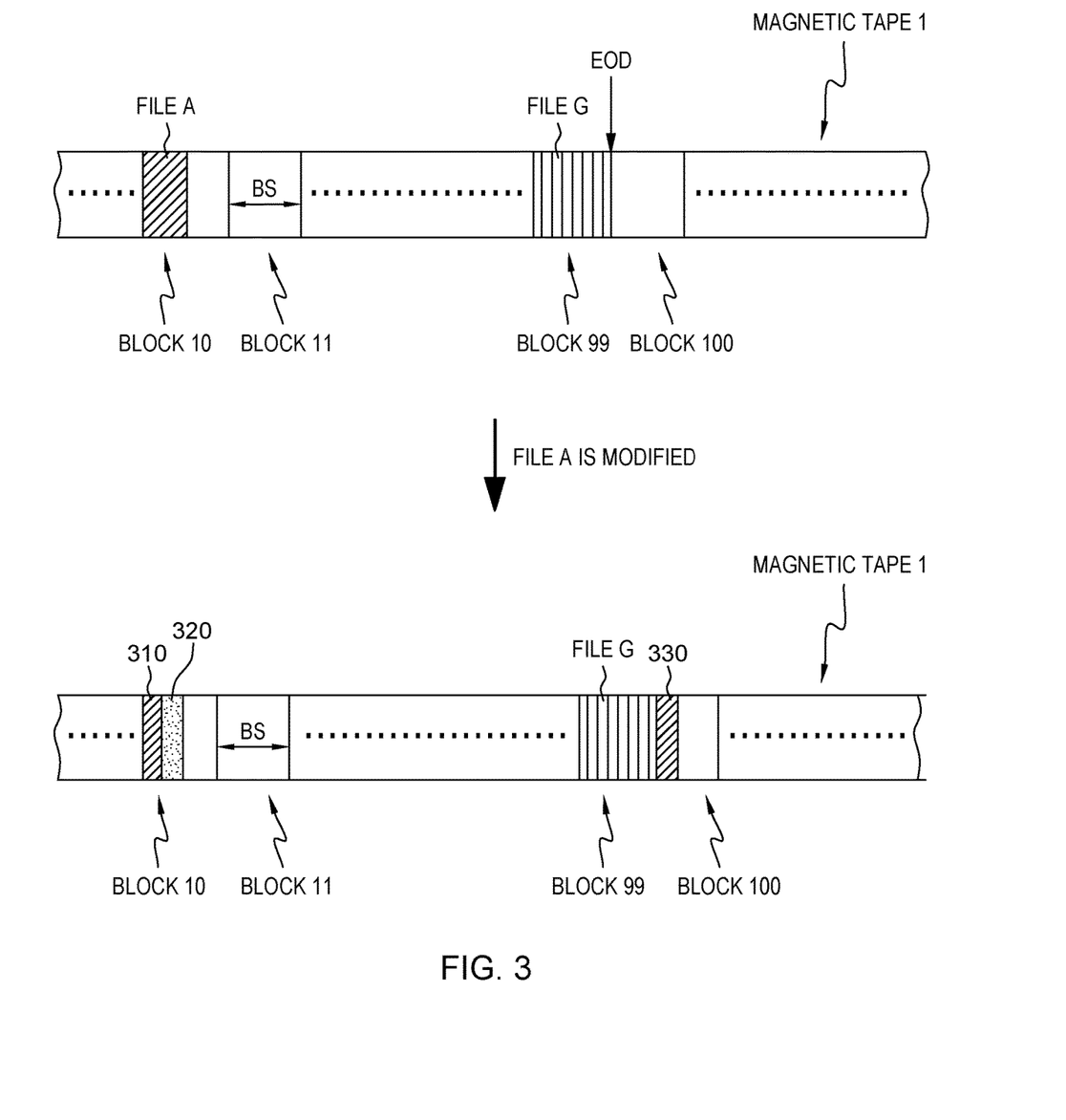
FIG. 3 is a block diagram illustrating an example of appending a modified portion of a file to a magnetic tape in accordance with flowchart step S212 of FIG. 2.

FIG. 3 is a block diagram illustrating an example of appending a modified portion of a file recalled to primary storage to the same magnetic tape media from which the file was recalled in accordance with at least one embodiment of flowchart step S212 of FIG. 2. Magnetic Tape 1 has a default "block size" (BS) of 256 bytes, as exemplified by the arrow labeled BS with respect to Block 11. File A is written to Block 10 as a single extent and has a byte size of 128 bytes and a byte offset of 0. Since File A was written to Magnetic Tape 1, additional file data has been subsequently written to Magnetic Tape 1, with File G being the last file data to be written to Magnetic Tape 1. File G is written to Block 99 and has a byte count of 256 bytes and a byte offset of 0. The end of File G, and thus the end of the data written to Magnetic Tape 1, is signified by the EOD mark.

After File A is recalled from Magnetic Tape 1 of secondary storage 130 to storage array 120 of primary storage, a second portion 320 of File A, having a byte size of 64 bytes is modified, while a first portion 310 of File A, also having a byte size of 64 bytes, is left unmodified. Assuming that Magnetic Tape 1 is loaded in a tape drive when the modification to File A was detected, the modification to second portion 320 of File A, depicted as modified portion 330, is appended to the EOD mark of Magnetic Tape 1 as a second extent. After appending modified portion 330 to the EOD mark, second portion 320 of File A is invalidated and an index list located in the index partition of Magnetic Tape 1 is updated to reflect the changes to File A. Specifically, File A now includes two extents. Extent 1 (formed from the unmodified first portion 310) includes the following information: Start Block—10, Byte Offset—0, Byte Count—64 bytes, and File Offset—0. Extent 2 (formed from modified portion 330) includes the following information: Start Block—100, Byte Offset—0, Byte Count—64 bytes, and File Offset—64 bytes.

Figure 4:
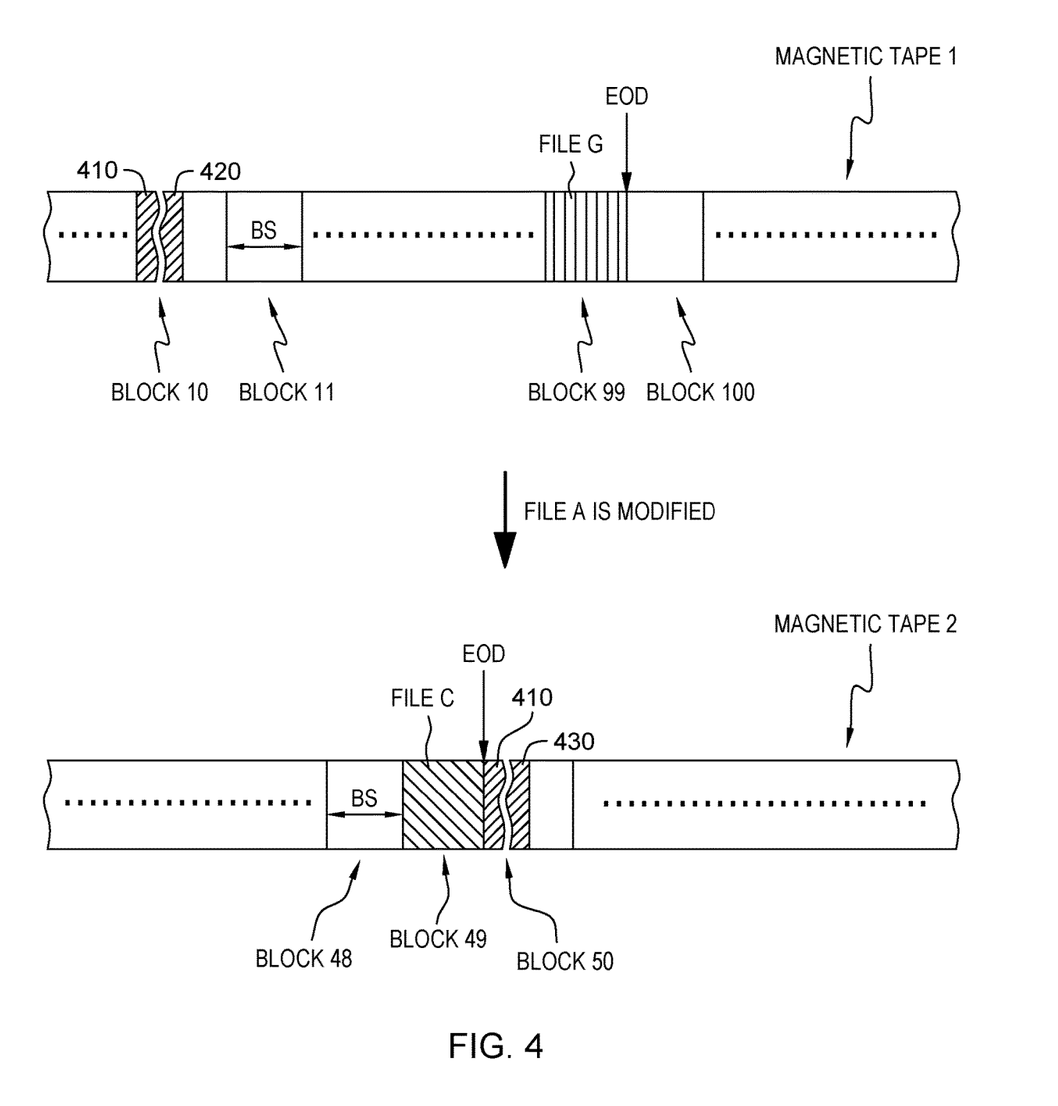
FIG. 4 is a block diagram illustrating an example of appending an entire file, including a modified portion of the file and any unmodified portions of the file, to a magnetic tape in accordance with flowchart step S214 of FIG. 2.

FIG. 4 is a block diagram illustrating an example of appending an entire file, including a modified portion of the file and an unmodified portion of the file, to a different magnetic tape than the magnetic tape from which the file was recalled in accordance with flowchart step S214 of FIG. 2. Magnetic Tape 1 has a default "block size" (BS) of 256 bytes, as exemplified by the arrow labeled BS with respect to Block 11. File A is written to Block 10 as a single extent and has a byte size of 128 bytes and a byte offset of 0. Since File A was written to Magnetic Tape 1, additional file data has been subsequently written to Magnetic Tape 1, with File G being the last file data to be written to Magnetic Tape 1. File G is written to Block 99 and has a byte count of 256 bytes and a byte offset of 0. The end of File G, and thus the end of the data written to Magnetic Tape 1, is signified by the EOD mark.

After File A is recalled from Magnetic Tape 1 of secondary storage 130 to storage array 122 of primary storage 120, a second portion 420 of File A, having a byte size of 64 bytes, is modified, while a first portion 410 of File A, also having a byte size of 64 bytes, is left unmodified. Assuming that Magnetic Tape 1 is not loaded in a tape drive when the modification to File A was detected, the modified portion is not appended to the EOD mark located at the beginning of Block 100. Rather, the modification to second portion 420 of File A, depicted as modified portion 430, and the unmodified first portion 410 of File A are appended to the EOD mark of Magnetic Tape 2 as a single extent. As depicted in FIG. 4, Magnetic Tape 2 also has a default "block size" (BS) of 256, as exemplified by the arrow labeled BS with respect to Block 48.

After appending both the unmodified first portion 410 of File A and the modified second portion 420 of File A, depicted as modified portion 430, to the EOD mark of Magnetic Tape 2, an extent list located in the index partition of Magnetic Tape 2 is updated to reflect the changes to File A. Specifically, a single data extent is created for File A, which has the following information: Start Block—10, Byte Offset—0, Byte Count—128 bytes, and File Offset—0.

Figure 5:
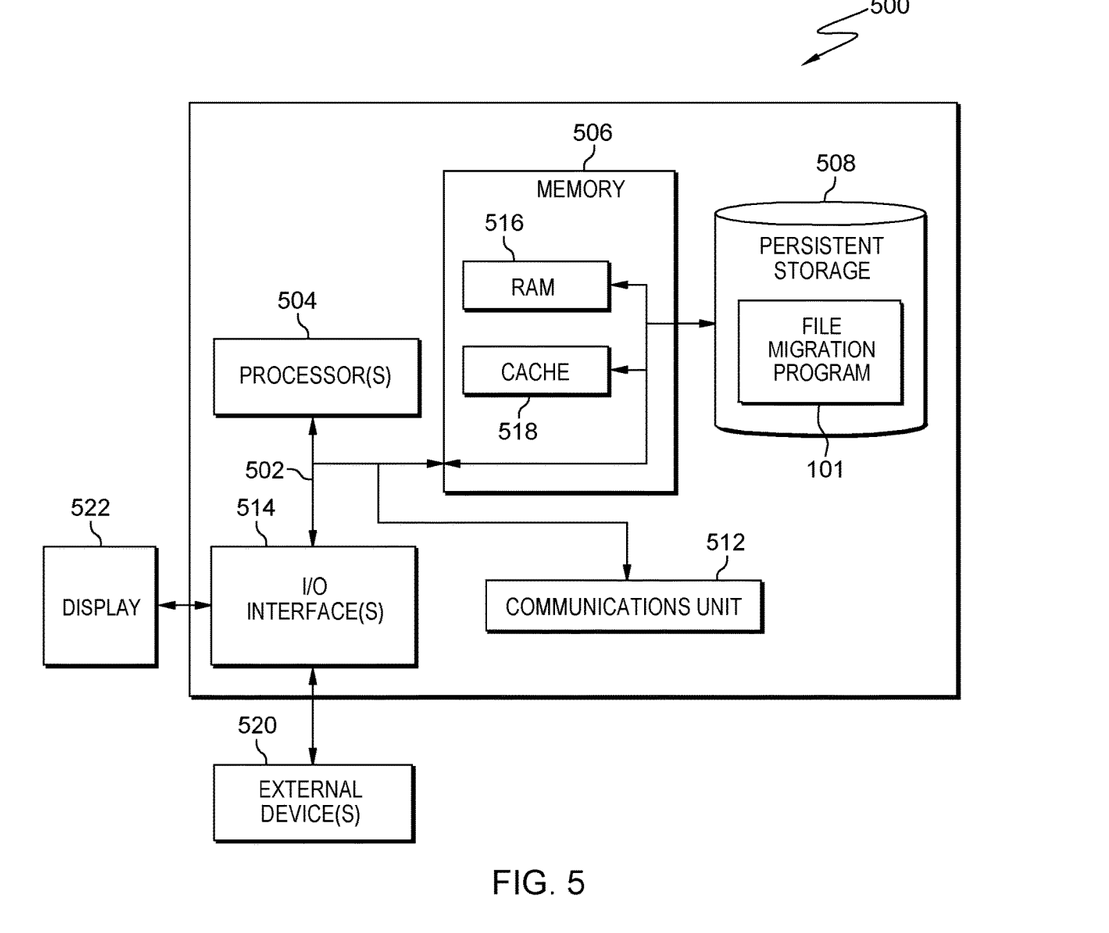
FIG. 5 is a block diagram depicting components of a computer, generally designated 500, suitable for executing file migration program 101 in accordance with at least one embodiment of the present invention.

FIG. 5 is a block diagram depicting components of a computing device, generally designated 500, suitable for executing file migration program 101 in accordance with at least one embodiment of the present invention. Computing device 500 includes one or more processor(s) 504 (including one or more computer processors), communications fabric 502, memory 506 including, RAM 516 and cache 518, persistent storage 508, communications unit 512, I/O interface(s) 514, display 522, and external device(s) 520. It should be appreciated that FIG. 5 provides only an illustration of one embodiment and does not imply any limitations with regard to the environments in which different embodiments may be implemented. Many modifications to the depicted environment may be made.

As depicted, computing device 500 operates over communications fabric 502, which provides communications between computer processor(s) 504, memory 506, persistent storage 508, communications unit 512, and input/output (I/O) interface(s) 514. Communications fabric 502 can be implemented with any architecture suitable for passing data or control information between processor(s) 504 (e.g., microprocessors, communications processors, and network processors), memory 506, external device(s) 520, and any other hardware components within a system. For example, communications fabric 502 can be implemented with one or more buses.

Memory 506 and persistent storage 508 are computer readable storage media. In the depicted embodiment, memory 506 includes random-access memory (RAM) 516 and cache 518. In general, memory 506 can include any suitable volatile or non-volatile one or more computer readable storage media.

Program instructions for file migration program 101 can be stored in persistent storage 508, or more generally, any computer readable storage media, for execution by one or more of the respective computer processor(s) 504 via one or more memories of memory 506. Persistent storage 508 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 can include one or more network interface cards. Communications unit 512 may provide communications through the use of either or both physical and wireless communications links. In the context of some embodiments of the present invention, the source of the various input data may be physically remote to computing device 500 such that the input data may be received, and the output similarly transmitted via communications unit 512.

I/O interface(s) 514 allows for input and output of data with other devices that may operate in conjunction with computing device 500. For example, I/O interface(s) 514 may provide a connection to external device(s) 520, which may be as a keyboard, keypad, a touch screen, or other suitable input devices. External device(s) 520 can also include portable computer readable storage media, for example thumb drives, portable optical or magnetic disks, and memory cards. Software and data used to practice embodiments of the present invention can be stored on such portable computer readable storage media and may be loaded onto persistent storage 508 via I/O interface(s) 514.

I/O interface(s) 514 also can similarly connect to display 522. Display 522 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
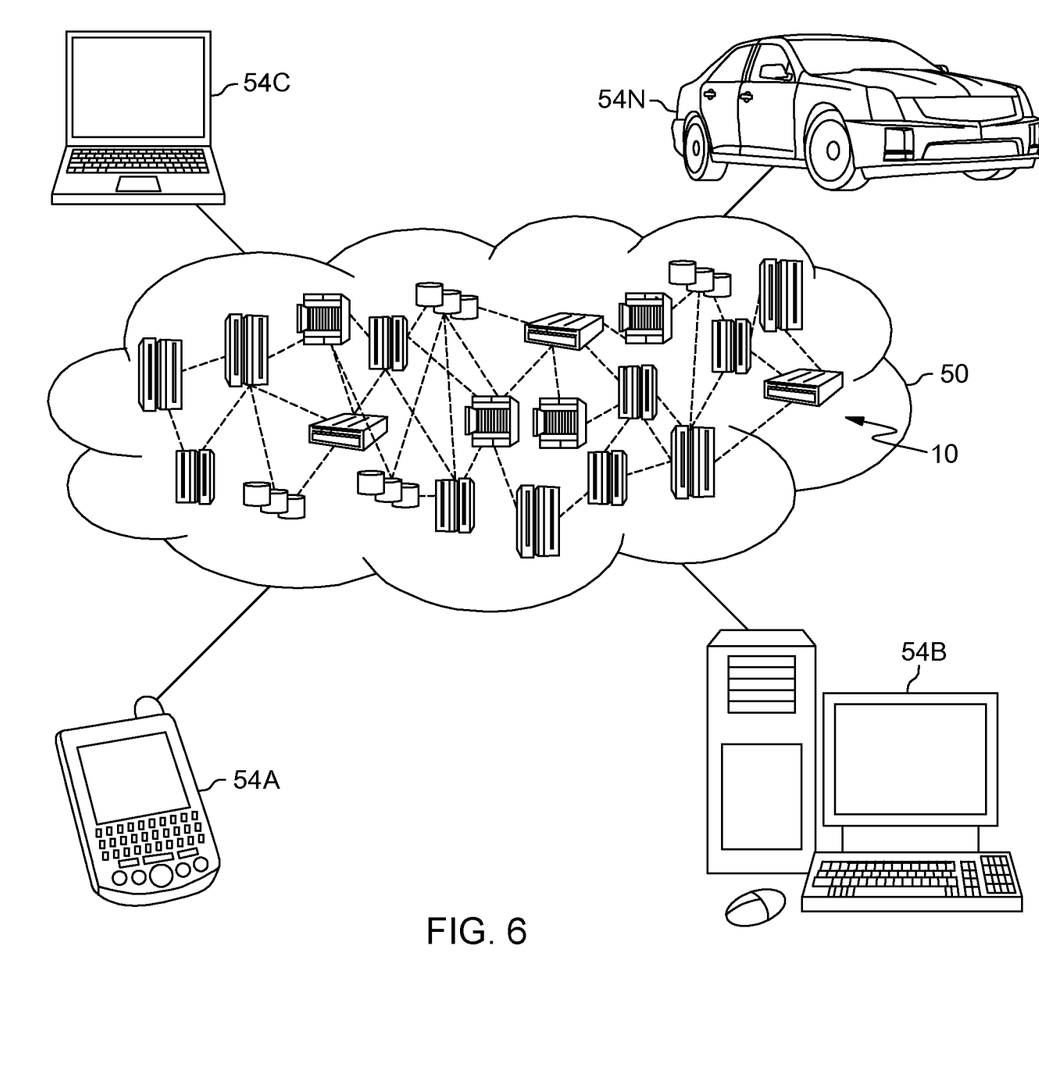
FIG. 6 is a block diagram depicting a cloud computing environment in accordance with at least one embodiment of the present invention.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
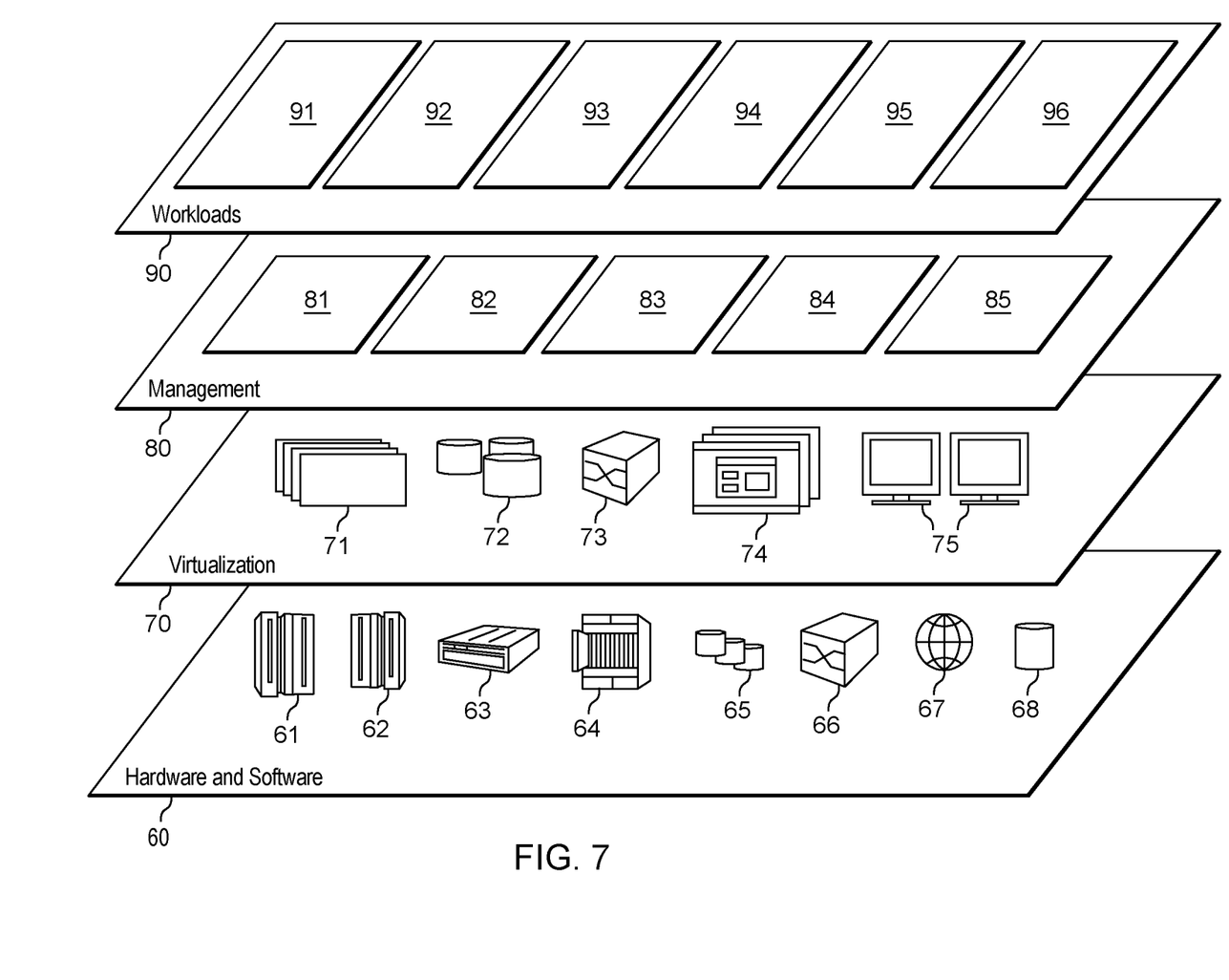
FIG. 7 is block diagram depicting abstraction model layers in accordance with at least one embodiment of the present invention.

FIG. 7 is block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hierarchical storage file recall and migration 96.

What is claimed is:

1. A computer-implemented method for migrating file data in a hierarchical storage environment, comprising:
    detecting that a file, recalled from a secondary storage device to a primary storage device, was modified, wherein the secondary storage device is a magnetic tape;
    determining whether the magnetic tape, from which the file was recalled, is loaded in a tape drive upon detecting that the file was modified;
    responsive to determining that the magnetic tape, from which the file was recalled, is loaded in the tape drive upon detecting that the file was modified:
        appending only a modified portion of the file to the magnetic tape; and
    responsive to determining that the magnetic tape, from which the file was recalled, is not loaded in the tape drive upon detecting that the file was modified:
        appending the file in its entirety, including the modified portion of the file and any unmodified portions of the file, to a different magnetic tape.

2. The computer-implemented method of claim 1, further comprising:
    determining the modified portion of the file based on comparing the modified file to a previous version of the file; and
    determining a data size of the modified portion of the file.

3. The computer-implemented method of claim 2, wherein appending only the modified portion of the file to the magnetic tape is further responsive to determining that an amount of free storage space on the magnetic tape is greater than the data size of the modified portion of the file.

4. The computer-implemented method of claim 1, further comprising, responsive to appending only the modified portion of the file to the magnetic tape:
    changing a state of the modified file from a Resident State to a Pre-Migration State;
    generating a new point-in-time copy of the modified file; and
    deleting one or more previous point-in-time copies of the file.

5. The computer-implemented method of claim 1, wherein appending the file in its entirety, including the modified portion of the file and any of the unmodified portions of the file, to the different magnetic tape is further responsive to determining that the different magnetic tape is currently loaded in a tape drive, and an amount of free storage space on the different magnetic tape is greater than a data size of the file in its entirety.

6. The computer-implemented method of claim 1, wherein the file in its entirety is appended to the different tape in accordance with a migration queue.

7. The computer-implemented method of claim 1, wherein the primary storage device is at least one of a hard disk drive or a solid state drive.

8. A computer program product for migrating file data in a hierarchical storage environment, the computer program product comprising a computer readable storage medium and program instructions stored on the computer readable storage medium, the program instructions including instructions to:
    detect that a file, recalled from a secondary storage device to a primary storage device, was modified, wherein the secondary storage device is a magnetic tape;
    determine whether the magnetic tape, from which the file was recalled, is loaded in a tape drive upon detecting that the file was modified;
    responsive to determining that the magnetic tape, from which the file was recalled, is loaded in the tape drive upon detecting that the file was modified:
        append only a modified portion of the file to the magnetic tape; and
    responsive to determining that the magnetic tape, from which the file was recalled, is not loaded in the tape drive upon detecting that the file was modified:
        append the file in its entirety, including the modified portion of the file and any unmodified portions of the file, to a different magnetic tape.

9. The computer program product of claim 8, further comprising instructions to:
    determine the modified portion of the file based on comparing the modified file to a previous version of the file; and
    determine a data size of the modified portion of the file.

10. The computer program product of claim 9, wherein the instructions to append only the modified portion of the file to the magnetic tape is further responsive to determining that an amount of free storage space on the magnetic tape is greater than the data size of the modified portion of the file.

11. The computer program product of claim 8, further comprising, responsive to appending only the modified portion of the file to the magnetic tape, instructions to:
   change a state of the modified file from a Resident State to a Pre-Migration State;
   generate a new point-in-time copy of the modified file; and
   delete one or more previous point-in-time copies of the file.

12. The computer program product of claim 8, wherein appending the file in its entirety, including the modified portion of the file and any of the unmodified portions of the file, to the different magnetic tape is further responsive to determining that the different magnetic tape is currently loaded in a tape drive, and an amount of free storage space on the different magnetic tape is greater than a data size of the file in its entirety.

13. The computer program product of claim 8, wherein the file in its entirety is appended to the different tape in accordance with a migration queue.

14. The computer program product of claim 8, wherein the primary storage device is at least one of a hard disk drive or a solid state drive.

15. A computer system for migrating file data in a hierarchical storage environment, the computer system comprising:
   one or more computer processors;
   one or more computer readable storage media; and
   computer program instructions, the computer program instructions being stored on the one or more computer readable storage media for execution by the one or more computer processors, and the computer program instructions including instructions to:
      detect that a file, recalled from a secondary storage device to a primary storage device, was modified, wherein the secondary storage device is a magnetic tape;
      determine whether the magnetic tape, from which the file was recalled, is loaded in a tape drive upon detecting that the file was modified;
      responsive to determining that the magnetic tape, from which the file was recalled, is loaded in the tape drive upon detecting that the file was modified:
         append only a modified portion of the file to the magnetic tape; and
      responsive to determining that the magnetic tape, from which the file was recalled, is not loaded in the tape drive upon detecting that the file was modified:
         append the file in its entirety, including the modified portion of the file and any unmodified portions of the file, to a different magnetic tape.

16. The computer system of claim 15, further comprising instructions to:
   determine the modified portion of the file based on comparing the modified file to a previous version of the file; and
   determine a data size of the modified portion of the file.

17. The computer system of claim 16, wherein the instructions to append only the modified portion of the file to the magnetic tape is further responsive to determining that an amount of free storage space on the magnetic tape is greater than the data size of the modified portion of the file.

18. The computer system of claim 15, further comprising, responsive to appending only the modified portion of the file to the magnetic tape, instructions to:
   change a state of the modified file from a Resident State to a Pre-Migration State;
   generate a new point-in-time copy of the modified file; and
   delete one or more previous point-in-time copies of the file.

19. The computer system of claim 15, wherein appending the file in its entirety, including the modified portion of the file and any of the unmodified portions of the file, to the different magnetic tape is further responsive to determining that the different magnetic tape is currently loaded in a tape drive, and an amount of free storage space on the different magnetic tape is greater than a data size of the file in its entirety.

20. The computer system of claim 15, wherein the primary storage device is at least one of a hard disk drive or a solid state drive.

* * * * *